United States Patent [19]

Schmidt

[11] Patent Number: 4,747,770
[45] Date of Patent: May 31, 1988

[54] FLUID COOLED HYDRAULIC ACTUATING MECHANISM FOR INJECTION MOLDING

[75] Inventor: Harald H. Schmidt, Georgetown, Canada

[73] Assignee: Mold-Masters Limited, Georgetown, Canada

[21] Appl. No.: 926,586

[22] Filed: Nov. 4, 1986

[30] Foreign Application Priority Data

Oct. 17, 1986 [CA] Canada .................................. 520804

[51] Int. Cl.[4] .............................................. B29C 45/23
[52] U.S. Cl. ................................ 425/549; 264/328.9; 264/328.15; 425/564; 425/566; 425/568; 425/570
[58] Field of Search ............... 425/549, 562, 563, 564, 425/566, 568, 572, 588, 547, 570; 264/328.14, 328.15, 328.9

[56] References Cited

U.S. PATENT DOCUMENTS

| | | | |
|---|---|---|---|
| 4,268,240 | 5/1981 | Rees et al. ........................... | 425/566 |
| 4,446,360 | 5/1984 | Gellert ................................. | 219/421 |
| 4,468,191 | 8/1984 | Gellert ................................. | 425/564 |
| 4,609,138 | 9/1986 | Harrison ............................. | 228/161 |

FOREIGN PATENT DOCUMENTS

1174020 9/1984 Canada .
1177213 11/1984 Canada .

OTHER PUBLICATIONS

Mold-Masters Manual, "Hydraulic Valve Gating Manual", Apr. 1984, pp. 10-12.
Mold-Masters brochure entitled "Master-Shot Nozzles", May 1985.

*Primary Examiner*—Jay H. Woo
*Assistant Examiner*—Timothy W. Heitbrink
*Attorney, Agent, or Firm*—Riches, McKenzie & Herbert

[57] ABSTRACT

This invention relates to a multi-cavity valve gated injection molding system wherein a continuous flow of hydraulic fluid through the actuating mechanism provides additional cooling. A pair of hydraulic fluid lines are drilled in the mold back plate to apply a minimum pressure differential across the cylinder chamber on one side of the piston. In the preferred embodiment, this pressure differential is also applied to opposite sides of a circular cooling chamber extending through the cylinder to provide additional cooling near a high pressure seal. Additional cooling is very advantageous to avoid system malfunctions and inferior product, particularly when molding high performance engineering resins at a high temperature.

5 Claims, 3 Drawing Sheets

FLUID COOLED HYDRAULIC ACTUATING MECHANISM FOR INJECTION MOLDING

BACKGROUND OF THE INVENTION

This invention relates to injection molding and more particularly to fluid cooled hydraulic actuating mechanism for a multi-cavity valve gated injection molding system.

It is well known to use hydraulically actuated pistons to reciprocate the valve pins in a valve gated injection molding system. One previous arrangement is shown in U.S. Pat. No. 4,468,191 to Gellert entitled "Hydraulically Actuated Injection Molding System with Alternated Hydraulic Connections" which issued Aug. 28, 1984. Although the actuating mechanism is seated in a water cooled back plate, overheating of the mechanism is a considerable problem with these systems. This is particularly true with the increasing demand to mold high performance engineering resins such as glass filled ULTEM (trade mark) where melt temperatures are as high as 850° F. During use, some heat is conducted and radiated from the heated manifold and the valve pin which results in the operating temperature gradually building up to an unacceptable level. This can lead to the hardening or material decomposition and break down of seals and O-rings, resulting in the leakage of hydraulic fluid.

In previous injection molding actuating mechanisms such as that shown in U.S. Pat. No. 4,468,191 referred to above, hydraulic fluid is connected by circumferential grooves to holes on opposite sides of the cylinder. However, there is no provision for continuous flow of hydraulic fluid and it remains static and gradually heats up. Other unsatisfactory attempts have been made to utilize flow of the hydraulic fluid for cooling, but none have produced adequate flow of fluid through the cylinder.

SUMMARY OF THE INVENTION

Accordingly, it is an object of the invention to at least partially overcome these disadvantages by providing for the flow of hydraulic fluid through the cylinder on at least one side of the piston.

To this end, in one of its aspects the invention provides a valve gated injection molding system comprising a manifold extending between a mold back plate and a plurality of spaced heated nozzles, each nozzle being seated in a cavity plate with a central bore in alignment with a gate leading to a cavity, an elongated valve pin having a driven end and a tip end mounted in the central bore of each nozzle, the driven end of each valve pin being operatively connected to hydraulic valve pin actuating mechanism mounted on the mold back plate whereby the valve pin is reciprocated between a retracted open position and a closed position wherein the tip end of the valve pin is seated in the gate and a melt passage branching from a common inlet in the manifold to longitudinal bores extending in the manifold to convey melt around the valve pin through the central bore of each nozzle to the respective gate, the improvement wherein, the valve pin actuating mechanism compresses a piston which is seated in a cylinder and connected to the driven end of the valve pin, at least three hydraulic fluid lines extending through the mold back plate, each line having ducts which branch off to connect to apply hydraulic pressure to one side of each piston to reciprocate the pistons according to a predetermined cycle, two of said lines extending through the mold back plate being a high pressure line and a low pressure line which are connected through respective high and low pressure ducts directly to the cylinder on the same side of each piston, a predetermined minimum pressure differential being maintained between the high and low pressure lines whereby a flow of hydraulic fluid is maintained through the cylinder on said same side of each piston to provide cooling.

DETAILED DESCRIPTION OF THE DRAWINGS

Figure 1:
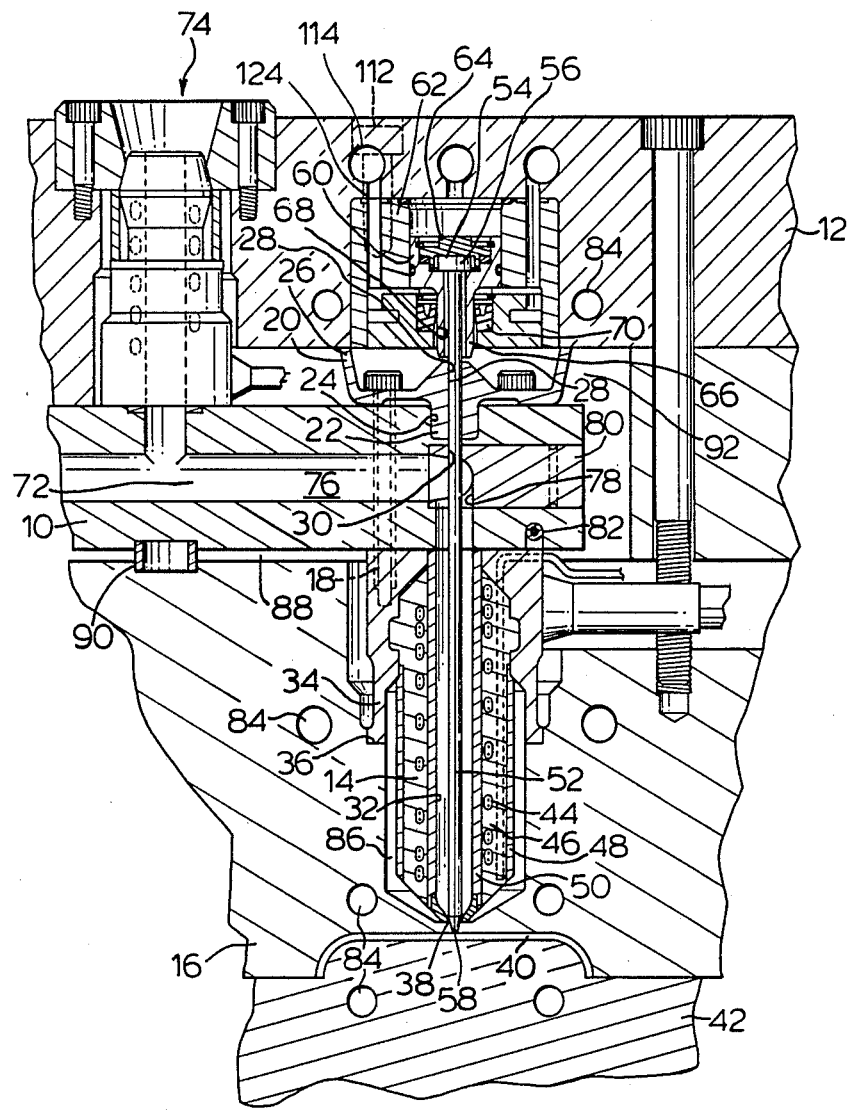
FIG. 1 is a sectional view of a portion of a multi-cavity valve gated injection molding system showing actuating mechanism according to a preferred embodiment of the invention.

Reference is first made to FIG. 1 which shows a portion of a multi-cavity valve gated injection molding system. In this embodiment, a manifold 10 extends between a mold back plate 12 and a number of heated nozzles 14 seated in a cavity plate 16. Each nozzle 14 is fixed to the manifold 10 by bolts 18 which extend through the manifold and also fix a sealing and retaining bushing 20 to the other side of the manifold. The seating and retaining bushing 20 has a collar portion 22 which is seated in a well 24 in the manifold 10 and an outer flanged portion 26 which extends to contact the mold back plate 12 during operation. The bushing 20 is described in more detail in the applicant's Canadian patent application Ser. No. 520,519 entitled "Sealing and Retaining Bushing for Injection Molding" filed Oct. 15, 1986.

The sealing and retaining bushing has a central bore 28 aligned with a transverse bore 30 through the manifold 10 and a central bore 32 through the nozzle 14. The nozzle 14 is seated in the well 24 of the cavity plate with a locating bushing portion 34 sitting on a shoulder 36. This locates the nozzle 12 with its central bore 32 in alignment with a gate 38 which extends through the cavity plate 16 to one of the cavities 40 formed between the cavity plate and a movable mold platen 42. In the embodiment shown, the heated nozzles 14 or sprue bushings 20 are made as described in U.S. Pat. No. 4,446,360 to Gellert entitled "Sprue Bushing Connector Assembly" which issued May 1, 1984. A helical heating element 44 is cast in a copper portion 46 between a stainless steel outer portion 48 and a stainless steel inner portion 50 which forms the central bore 32.

An elongated valve pin 52 having a driven end 54 with an enlarged head 56 and a tip end 58 extends through the aligned central bore 28 of the bushing, the transverse bore 30 through the manifold 10 and the central bore 32 of the nozzle 14. The driven end 54 of the valve pin 52 is connected to actuating mechanism seated in the mold back plate 12 which reciprocates the valve pin 52 between a retracted open position and a closed position in which the tip end 58 is seated in the gate 38. The actuating mechanism includes a piston 60 which reciprocates in a cylinder 62. The valve pin 52 extends through the piston 60 and the enlarged head 56 is secured to it by a cap 64 as described in the applicant's Canadian patent application Ser. No. 524,969 entitled "Mechanism for Valve Gated Injection Molding with Resilient Retaining Ring" filed Dec. 10, 1986.

The piston 60 has an elongated neck portion 66 which protrudes out an opening 68 in the cylinder 62. A V-shaped high pressure seal 70 which is seated in the cylinder 62 extends around the neck portion 66 to prevent the leakage of pressurized hydraulic fluid.

As shown, the seal 70 is held in place by a washer 69 and a split resilient retaining or snap ring 71. The actuating mechanism is driven by hydraulic fluid as described in more detail below.

A melt passage 72 extends through a heated sprue bushing 74 which receives pressurized melt from a molding machine (not shown) to the manifold 10 where it branches out through longitudinal bores 76. The sprue bushing 74 in this embodiment is made by the method described in Gellert's Canadian patent application Ser. No. 496,645 entitled "Manufacturing Method for Selected Gate Configuration Injection Molding Nozzles" filed Dec. 2, 1985. Each longitudinal bore 76 connects to an enlarged portion 78 of the transverse bore 30 through the manifold. The melt passage 72 extends through the enlarged portion 78 of the transverse bore 30 and through the central bore 32 through the nozzle around the valve pin 52 to the gate 38. A machined plug 80 is brazed into the manifold 10 to provide a smooth joint between them as described in the applicant's U.S. Pat. No. 4,609,138 entitled "Method of Manufacturing Injection Molding Manifold with Plugs" which issued Sept. 2, 1986.

As is well known, it is critical to successful operation of the system that the hot melt be maintained within a certain temperature range as it flows along the melt passage 72 to the gate 38. Thus, the sprue bushing 74 is heated, each nozzle 14 is heated by the electrical heating element 44, and the manifold 10 is heated by an electrical heating element 82 which is cast into it as described in Canadian patent No. 1,174,020 to Gellert entitled "Injection Molding Manifold Member and Method of Manufacture" which issued Sept. 11, 1984. As is also well known, it is necessary to separate these heated components of the system from the adjacent mold back plate 12 and cavity plate 16 which are cooled by water flowing through cooling channels 84. Thus, an insulative air space 86 is provided between each nozzle 14 and the surrounding cavity plate 16 by the locating bushing portion 34 seating on shoulder 36. Similarly, another insulative air space 88 is provided between the hot manifold 10 and the cooled cavity plate 16 by a central locating ring 90 and the height of the nozzles 14 to which the manifold 10 is secured. A further insulative air space 92 is provided between the hot manifold 10 and the cooled mold back plate 12 by sealing and retaining bushing 20. In addition to retaining the manifold 10 and the nozzles 14 tightly in place, the bushing 20 also provides a seal against the leakage of melt around the reciprocating valve pin 52.

Figure 2:
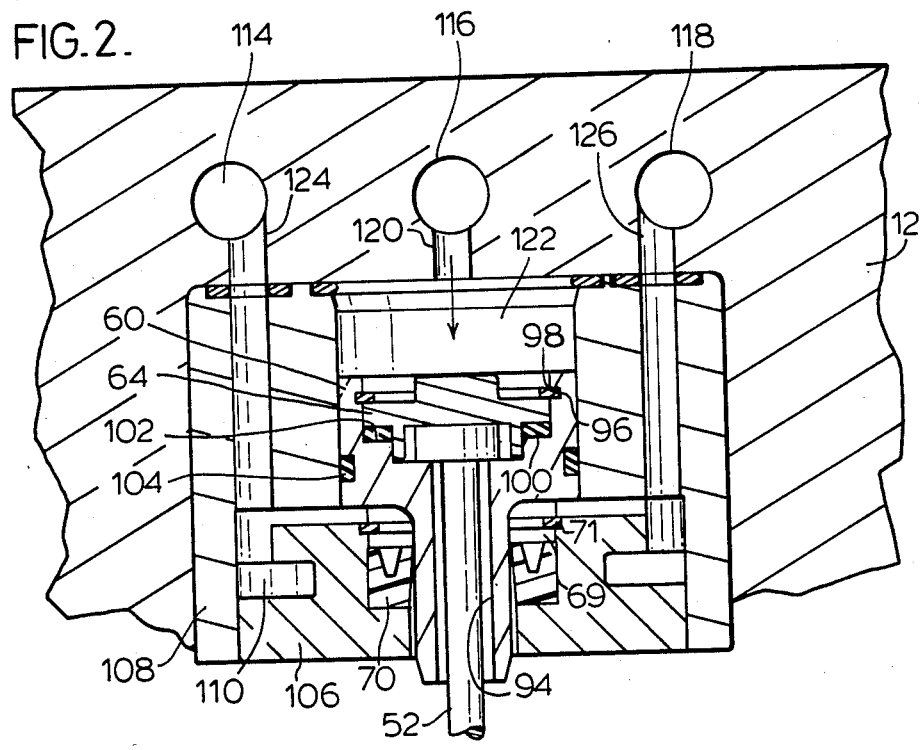
FIG. 2 is a partial sectional view showing the piston and valve pin in the closed position.
Figure 3:
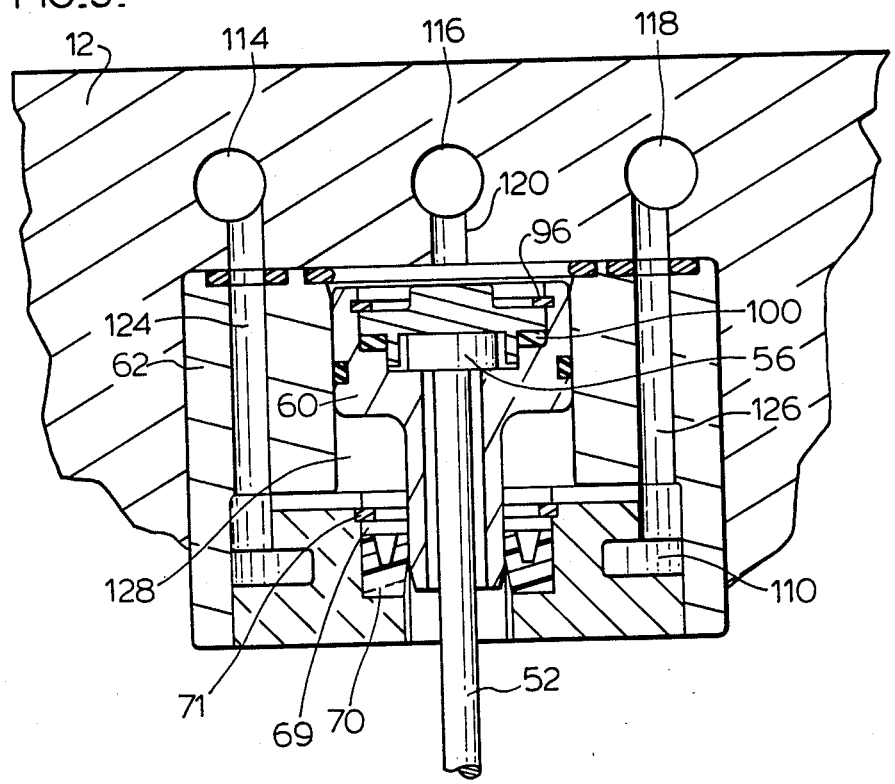
FIG. 3 is a similar sectional view showing the piston and valve pin in the open position.

As described above, each hydraulic actuating mechanism includes a piston 60 which reciprocates in a cylinder 62. The piston 60 has a central bore 94 which receives the valve pin 52 through it. The driven end of the valve pin 52 is secured to the piston 60 by the cap 64 which covers the enlarged head 56 of the piston 60. The cap 64 is retained in place between a resilient split ring 96 which is received in a groove 98 and a resilient O-ring 100. As may clearly be seen in FIGS. 2 and 3, the O-ring 100 is compressed against a shoulder 102 to provide a seal against leakage of hydraulic fluid. This removable connecting arrangement is described in more detail in the applicant's Canadian patent application Ser. No. 524,969 referred to above. A further O-ring seal 104 is located in a seat between the piston 60 and the cylinder 62 to avoid leakage between them.

The cylinder 62 is made from inner and outer generally cylindrical portions 106,108. The steel portion 106,108 are machined and drilled to the shapes shown to provide a circular cooling chamber 110 between them. The two portions 106,108 are then brazed together by applying a necked brazing paste and heating them in a vacuum furnace to form an integral cylinder 62 with the desired shape. Each cylinder 62 is seated in the mold back plate 12 and held in position by bolts 112. The piston 60 is reciprocated in the cylinder 62 by pressurized hydraulic fluid flowing through hydraulic fluid lines 114,116,118. The lines 114,116,118 are drilled in the mold back plate 12 to extend past each cylinder in the system and are connected to controlled sources of hydraulic fluid (not shown).

Figure 4:
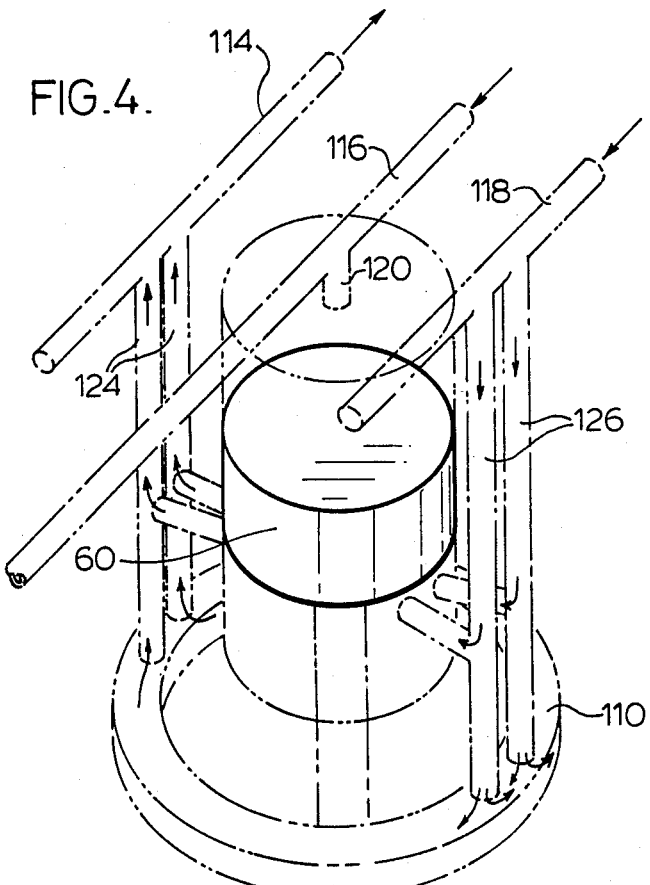
FIG. 4 is a diagramatic view showing the flow of hydraulic fluid in the system shown in FIG. 1.
Figure 5:
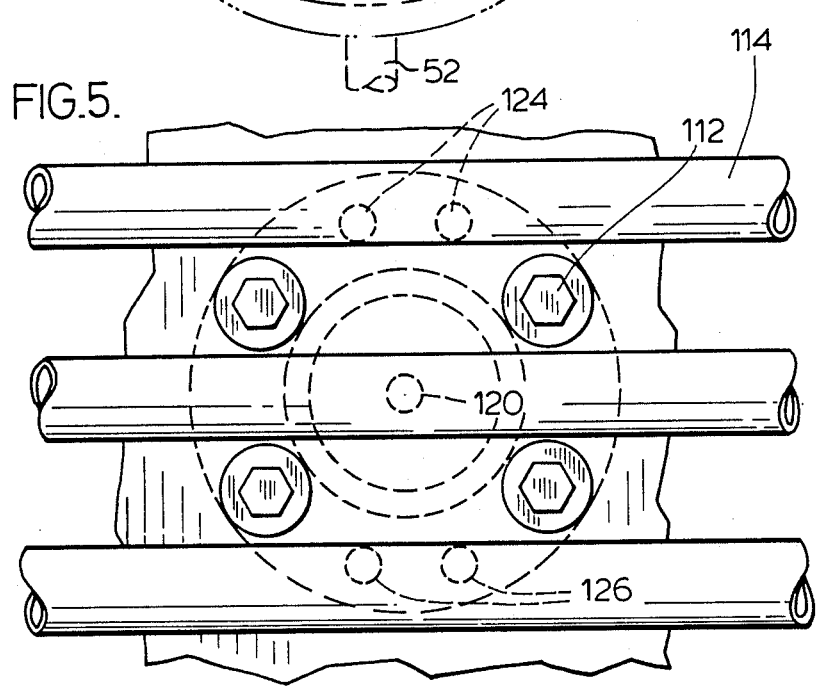
FIG. 5 is a sectional view taken along line 5—5 in FIG. 1.

In the embodiment shown, the central line 116 is connected by a duct 120 to the closing side 122 of each cylinder chamber. Thus, when higher hydraulic pressure is applied to this line, each piston 60 and valve pin 52 are driven to the forward closed position shown in FIG. 2. Similarly, each of the outer hydraulic lines 114,118 are connected by ducts 124,126 to the opening side 128 of each cylinder chamber. While a single duct 124,126 can be used on each side of the cylinder, in this preferred embodiment as shown diagramatically in FIG. 4, a pair of ducts 124,126 are drilled on each side to reduce the required diameters of the ducts without causing excessive pressure drop in the hydraulic fluid. In this embodiment, in addition to connecting the hydraulic fluid lines 114,118 to opposite sides of the opening side 128 of each cylinder chamber, the ducts 124,126 also extend to opposite sides of the cooling chamber 110. A source of hydraulic fluid is connected to the lines 114,118 to maintain a predetermined minimum pressure differential between high pressure line 118 and low pressure line 114. As clearly shown in FIG. 4, this results in the flow of hydraulic fluid through both the opening side 128 of the cylinder chamber and the circular cooling chamber 110. Thus, this circulation of hydraulic fluid avoids the build up of the temperature of the fluid in the opening side 128 of the cylinder chamber which otherwise occurs in a static situation. In addition, the circulation of hydraulic fluid through the cooling chamber 110 provides cooling to the cylinder 62 in the area of the high pressure V-shaped seal 70. This is very advantageous when molding high temperature materials because seal 70 is normally made of a fluorocarbon and temperatures above about 650° F. will cause it to harden and leak. If this additional cooling is not required for the V-shaped seal 70, then the ducts 124,126 would extend directly to connect to opposite sides of the cylinder. Of course, when the hydraulic pressure is released in central line 116 and higher pressure applied through lines 114,118 to the opening side 128 of each cylinder chamber, each piston 60 and valve pin 52 are retracted to the open position shown in FIG. 3.

In use, the system is assembled as described above. The sealing and retaining bushings 20 are bolted through the manifold 10 to the nozzles 14. This applies an initial preload so that melt does not escape between them initially. The height of the flanged portions 26 of the cold bushings 20 is slightly less than the width of the desired air space 92 to allow for heat expansion. Similarly, there is provision for slight lateral movement of the valve pin 52 relative to the piston 60 to allow for lateral thermal expansion of the manifold 10 from the central locating ring 90. Electrical power is applied to the sprue bushing 74 and the heating elements 44,82 of heat the nozzles 14 and the manifold 10 to heat them to predetermined temperatures. The sealing and retaining bushings 42 expand into bearing contact with the mold back plate 12 to apply a further load to securely tighten the manifold 10 and the nozzles 14 into position and maintain the desired air space 86,88,92. Hot pressurized melt is then introduced into the recessed inlet 74 of the melt passage 72 from a molding machine (not shown). Controlled hydraulic fluid pressure is applied to the fluid lines 114,116,118 to control simultaneous actuation of the valve pins 52 according to a predetermined cycle. With the valve pins 52 in the retracted open position, the melt flows through the melt passage 72 to the gates 38 and into the cavities 40. When the cavities 40 are full, the pressure is held momentarily to pack. Greater hydraulic pressure is then applied to line 116 to reciprocate the valve pins 52 to the closed position with each tip end 58 seated in one of the gates 38. The injection pressure is then reduced and the position held for a short cooling period before the mold opens for ejection. After the mold is closed again, greater hydraulic pressure is applied through lines 114,118 to withdraw the valve pins to the open position and the melt injection pressure is reapplied to refill the cavities. This cycle is repeated continuously every few seconds depending upon the size and shape of the cavities and the type of material being molded.

It will be appreciated that in this embodiment of the invention, the hydraulic fluid is circulated only through the opening side 128 of the cylinder chamber. While this side is preferred because it is closer to the source of heat being conducted along the valve pin 52, it is also possible to have the cooling circulating flow of hydraulic fluid through the closing side 122 of the cylinder chamber. Alternatively, circulating flow can be provided on both sides of the piston by drilling another hydraulic fluid line with more ducts in the mold back plate 12 to supply hydraulic fluid with a minimum pressure differential across separate connections to each side of the cylinder chamber.

While the description of the actuating mechanism and the injection molding system have been given with respect to preferred embodiments, it is not to be construed in a limiting sense. Variations and modifications will occur to those skilled in the art. For instance, it is apparent that the lines, ducts, and cooling chamber can have alternate configurations from that shown. Similarly, the injection molding system can have various manifold configurations and different heated nozzles can be used. Reference is made to the appended claims for a definition of the invention.

What I claim is:

1. In a multi-cavity valve gated injection molding system comprising a manifold extending between a mold back plate and a plurality of spaced heated nozzles, each nozzle being seated in a cavity plate with a central bore in alignment with a gate leading to a cavity, an elongated valve pin having a driven end and a tip end mounted in the central bore of each nozzle, the driven end of each valve pin being operatively connected to hydraulic valve pin actuating mechanism mounted on the mold back plate whereby the valve pin is reciprocated between a retracted open position and a closed position wherein the tip end of the valve pin is seated in the gate and a melt passage branching from a common inlet in the manifold to longitudinal bores extending in the manifold to convey melt around the valve pin through the central bore of each nozzle to the respective gate, the improvement wherein;

the valve pin actuating mechanism comprising a piston which is seated in a cylinder and connected to the driven end of the valve pin, at least three hydraulic fluid lines extending through the mold back plate, each line having ducts which branch off to connect to each cylinder to apply hydraulic pressure to one side of each piston to reciprocate the pistons according to a predetermined cycle, two of said lines extending through the mold back plate being a high pressure line and a low pressure line which are connected through respective high and low pressure ducts directly to the cylinder on the same side of each piston, a predetermined minimum pressure differential being maintained between the high and low pressure lines whereby a flow of hydraulic fluid is maintained through the cylinder on said one side of each piston to provide cooling.

2. An injection molding system as claimed in claim 1, wherein the high and low pressure ducts extend through opposite sides of the cylinder.

3. An injection molding system as claimed in claim 2, wherein there are a pair of high pressure ducts and a pair of low pressure ducts on opposite sides of each cylinder.

4. An injection molding system as claimed in claim 2, wherein each cylinder has a circular cooling chamber extending around the piston, the high and low pressure ducts being also connected to the cooling chamber on opposite sides of the piston, whereby a flow of hydraulic fluid is also maintained through the cooling chamber to provide additional cooling.

5. An injection molding system as claimed in claim 4, wherein each piston has a neck portion which protrudes out an opening through the cylinder, the piston having a central bore which extends through the neck portion and receives the valve pin therethrough, a high pressure seal seated in the opening through each cylinder extends around the neck portion of each piston to seal against the leakage of hydraulic fluid between the cylinder and the neck portion of the piston, the cooling chamber extending through the cylinder near the seal to provide cooling to the seal.

* * * * *